United States Patent
Smalley et al.

(10) Patent No.: US 7,896,150 B2
(45) Date of Patent: Mar. 1, 2011

(54) ARTICLE POSITIONER FOR A CONVEYOR SYSTEM

(75) Inventors: Charles Smalley, Clearwater, FL (US); Paul Green, Clearwater, FL (US)

(73) Assignee: L-3 Communications, Security Detection Systems, Inc., Woburn, MA (US)

( * ) Notice: Subject to any disclaimer, the term of this patent is extended or adjusted under 35 U.S.C. 154(b) by 484 days.

(21) Appl. No.: 11/655,769

(22) Filed: Jan. 19, 2007

(65) Prior Publication Data

US 2007/0205083 A1    Sep. 6, 2007

Related U.S. Application Data

(60) Provisional application No. 60/760,756, filed on Jan. 20, 2006.

(51) Int. Cl.
    B65G 47/24    (2006.01)
(52) U.S. Cl. .............. 198/415; 198/412; 198/457.02; 198/370.03
(58) Field of Classification Search ............. 198/412, 198/415; 53/504, 503, 52
    See application file for complete search history.

(56) References Cited

U.S. PATENT DOCUMENTS

| 1,156,756 A | | 10/1915 | Chamberlin | |
| 4,676,361 A | * | 6/1987 | Heisler | 198/394 |
| 5,331,118 A | * | 7/1994 | Jensen | 177/25.14 |
| 6,812,426 B1 | * | 11/2004 | Kotowski et al. | 209/589 |
| 2003/0209407 A1 | * | 11/2003 | Brouwer et al. | 198/457.02 |
| 2004/0104100 A1 | | 6/2004 | Schiesser et al. | |
| 2005/0072655 A1 | * | 4/2005 | Raque et al. | 198/455 |
| 2005/0115801 A1 | | 6/2005 | Holmgren | |
| 2005/0167244 A1 | * | 8/2005 | Brouwer et al. | 198/443 |

FOREIGN PATENT DOCUMENTS

| EP | 1180484 A2 | 2/2002 |
| EP | 1205410 A1 | 5/2002 |
| GB | 1156756 A | 7/1969 |
| GB | 2144698 A | 3/1985 |
| WO | WO2004076319 A | 9/2004 |
| WO | WO2006096292 A | 9/2006 |
| WO | WO2006130420 A2 | 12/2006 |

OTHER PUBLICATIONS

International Search Report and Written Opinion for International Application No. PCT/US2007/001318 dated Jul. 5, 2007.

* cited by examiner

*Primary Examiner*—Gene Crawford
*Assistant Examiner*—Kavel Singh
(74) *Attorney, Agent, or Firm*—Wolf, Greenfield & Sacks, P.C.

(57) ABSTRACT

A method and apparatus for reducing the likelihood of an article becoming jammed in a conveyor system. The width of an article, like luggage, may be detected and the article rotated if the width is greater than a threshold value. A jammed article in the conveyance system may be detected, and repositioned by a positioner, to clear the jam. Spacing between articles in the conveyor system may also be controlled.

25 Claims, 5 Drawing Sheets

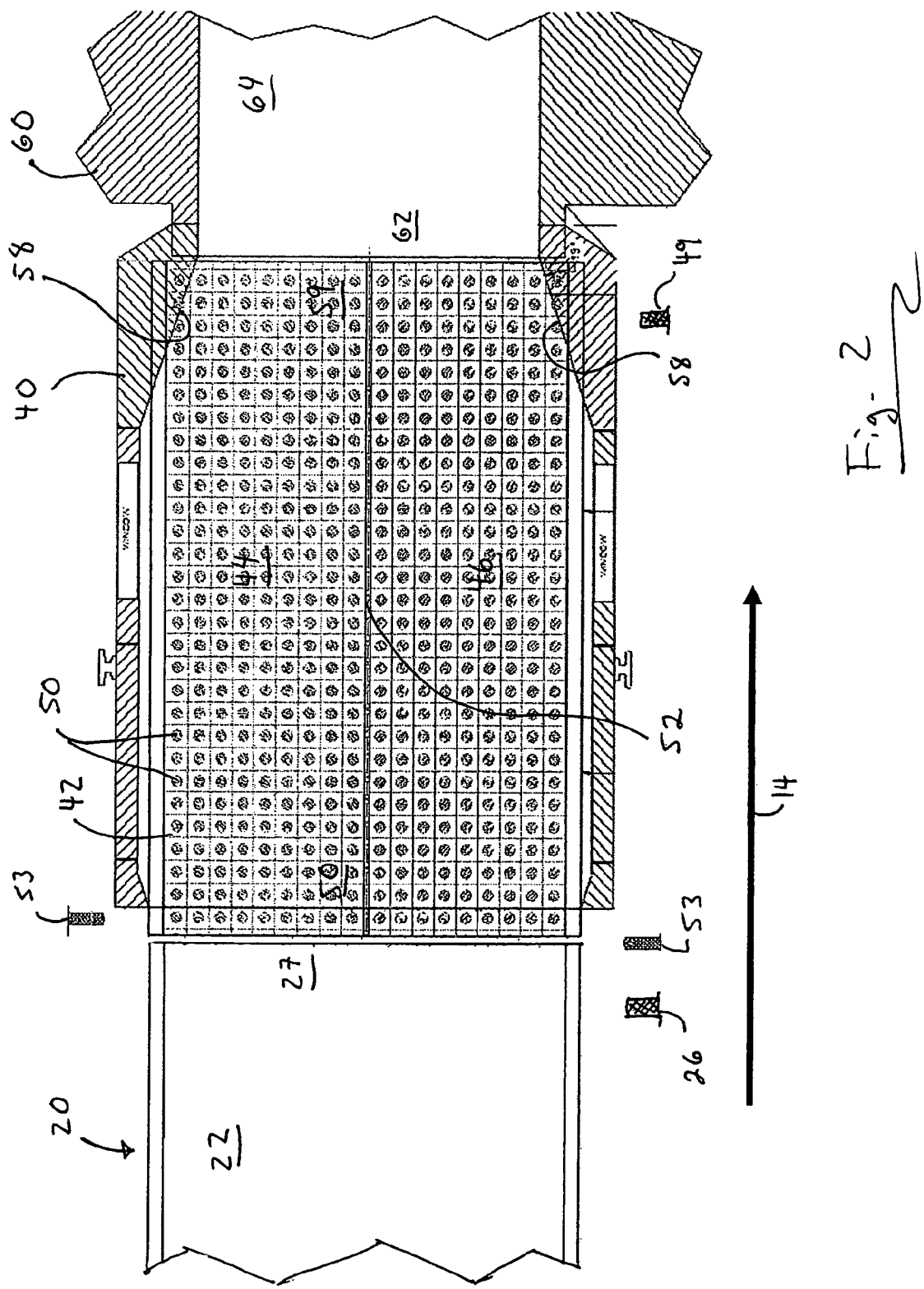

ARTICLE POSITIONER FOR A CONVEYOR SYSTEM

CROSS REFERENCE TO RELATED APPLICATION

This application claims priority under 35 U.S.C. §119(e) to U.S. Provisional Application Ser. No. 60/760,756, entitled "One-Meter Wide Tunnel System" filed on Jan. 20, 2006, which is incorporated by reference in its entirety.

BACKGROUND

1. Field

This application relates generally to positioning an article on a conveyor system to reduce the likelihood of the article becoming jammed in the conveyor system and/or to alleviate a jam that has occurred.

2. Discussion of Related Art

Luggage is typically conveyed throughout an airport or secure facility on a system of conveyors, often referred to as a luggage handling system, regardless of whether the system is used to convey carry-on luggage or checked luggage. The luggage handling system typically includes an inspection system to screen the luggage, such as for contraband items.

It is common for inspection systems to be configured to only accept articles that are smaller in width and/or height than predetermined, threshold dimensions, even if the luggage handling system is capable of conveying articles that are much larger. By way of example, many of such inspection systems accept only articles that are smaller than 28 inches in width and/or height while the luggage handling systems conveys articles to the inspection system on a conveyor belt that is 1 meter wide, and can handle articles that are as wide, if not wider than the belt. Articles of luggage that are not positioned in alignment with an entrance to the inspection system may become jammed.

Articles that become jammed may cause delays, if not attended to promptly by an operator. Jammed luggage may also require manual intervention by an operator, which can cause a distraction if the operator is also attempting to screen luggage that passes through the inspection system. Existing systems operate with jam occurrence rates as high as one out of every ten items of luggage that are conveyed to an inspection system.

The applicants appreciate that there is a need for a method and/or apparatus that reduces the likelihood of a jam from occurring in a conveyor system, and for a system that automatically clears any jams that do occur.

SUMMARY OF THE INVENTION

In one aspect of the invention, a conveyor apparatus comprises a conveyor belt that has a first belt segment that, when operated, moves along a first axis to convey an article. The conveyor belt also has a second belt segment that, when operated, moves along the first axis substantially parallel to the first belt segment. A first detector detects a width, in a direction that lies transverse to the first axis. A controller controls the first belt segment to move relative to the second belt segment to rotate the article on the conveyor belt when the width is greater than a threshold value.

In another aspect, the invention relates to a method of positioning an article on a conveyor. The method comprises measuring a width of an article in a direction transverse to a direction in which the article is being conveyed. An automatic determination is made as to whether the width of the article is greater than a threshold width and the article is rotated when the width of the article is greater than the threshold width.

In yet another aspect, the invention relates to a conveyor apparatus that comprises a conveyor belt that has a first belt segment that, when operated, moves along a first axis to convey an article in a downstream direction. The conveyor belt also has a second belt segment that, when operated, moves along the first axis substantially parallel to the first belt segment. A detector detects a jammed article on the conveyor belt and a controller automatically controls the first belt segment to move relative to the second belt segment to rotate the article in a first direction when the detector detects the jammed article.

In a further aspect, the invention relates to a method of automatically clearing a jam of a conveyor that conveys an article in a downstream direction. The method comprises automatically identifying the jam, with a first detector, of an article at a first position of the conveyor system. The method also comprises automatically rotating the article on the conveyor belt and then moving the conveyor belt in the downstream direction.

In yet another aspect, the invention relates to a conveyor system that comprises an in-feed conveyor that conveys articles in a downstream direction, a positioner that receives the articles from the in-feed conveyor, and an inspection system that receives articles from the positioner. The positioner comprises a conveyor belt having a first belt segment that, when operated, moves along a first axis to convey the article and a second belt segment that, when operated, moves along the first axis substantially parallel to the first belt segment. The positioner also comprises a first detector that detects a width of the article in a direction that lies transverse to the first axis. A controller controls the first belt segment to move relative to the second belt segment to rotate the article on the conveyor belt when the width is greater than a threshold value. The conveyor belt has a width greater than the threshold value and a width of an entryway of the inspection system corresponds to the threshold value.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 is a cutaway, top view, of portions of the conveyor system of FIG. 1;

DETAILED DESCRIPTION

Figure 1:
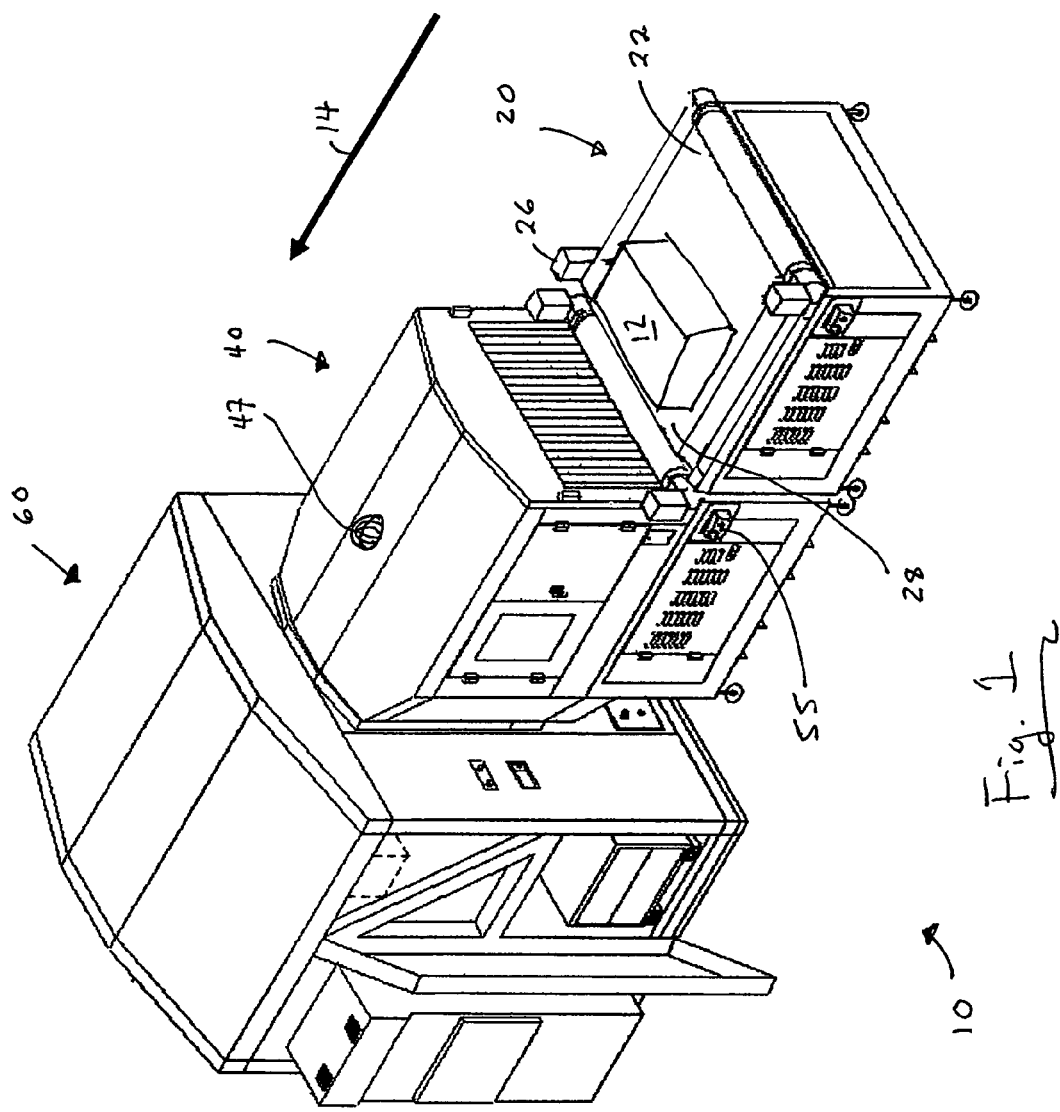
FIG. 1 is a perspective view of a conveyor system that includes an in-feed conveyor, a positioner, and an inspection system.

The article positioner of the present invention reduces the likelihood of an article becoming jammed within a conveyor system. The positioner may identify whether an article, like luggage, is oriented properly for passage into a downstream portion of the system, such as a luggage inspection system that detects explosives or other contraband. The system may also detect when an article has become temporarily jammed and then automatically position the article to clear the jam.

The conveyor system may include an in-feed conveyor, a positioner that receives articles from the in-feed conveyor, and an inspection system that receives articles from the positioner. According to some embodiments, the in-feed conveyor is a portion of a luggage handling system, as may be commonly found in airports for handling the luggage of airplane passengers.

The positioner may include a conveyor belt having multiple, separate belt segments that move parallel to one another along the direction in which articles are conveyed. Each of the belt segments may be driven by a separate motor such that, when desired, the belt segments can be moved relative to one another to impart a moment to an article, which can rotate an article for passage through the inspection system. The multiple belt segments may also be moved in tandem to convey an article without also rotating the article.

The conveyor belt of the positioner may include rollers incorporated into the conveyor belt and that urge an article in a direction transverse to the direction in which the conveyor belt is moving. The rollers may be arranged to urge an article in different directions about the belt and may also cooperate to position the article for passage into the inspection system. According to some embodiments, the rollers urge articles toward a central portion of the belt.

Detectors of the positioner may identify the width of an article to determine whether the article is likely to become jammed at an downstream position, such as the inspection system entrance. A controller of the system may then cause the article to be rotated or otherwise positioned in an orientation that is less likely cause a jam.

The positioner may automatically detect when an article becomes jammed on the conveyor belt, such as at the entrance of the inspection system. When the jam is detected the article may automatically be urged in an upstream direction, rotated, and then re-conveyed in the downstream direction. This process may be repeated multiple times until the jam is cleared or the positioner determines that manual intervention may prove beneficial.

The conveyor system may be automatically controlled to maintain spacing between articles on a conveyor belt. The conveyor belts of the in-feed conveyor, the positioner, and/or the inspection system may be turned on or off, or the speeds of the conveyor belts may be altered to position the articles with a desired amount of spacing.

The conveyor system may be operated to prevent the likelihood of a jam from occurring for a given throughput requirement of the system. When lower throughput requirements are necessary, the number of articles and/or the spacing between articles may be set to provide the least likelihood of a jam occurrence. As the throughput requirements for the conveyor system increase, a controller may automatically adjust the number of articles and/or the spacing between articles.

Turn now to the figures, and initially FIG. 1, which shows a conveyor system 10 that includes an in-feed conveyor 20, a positioner 40, and an inspection system 60. In the illustrated embodiment, the in-feed conveyor 20 is a portion of a luggage handling system like that commonly found in airports for moving luggage. The positioner 40 receives articles of luggage 12 from the in-feed conveyor 20 and positions them to reduce the likelihood of the article from becoming jammed when conveyed to the inspection system 60. The inspection system 60 may comprise an X-ray scanner, an explosives detection system, any other type of inspection system, or simply another conveyor segment of a luggage handling system, as aspects of the invention are not limited in this respect.

In-feed conveyor 20 includes a conveyor belt 22 that forms a continuous loop about supporting rollers 24. A motor is mechanically connected to one or more of the rollers to drive the belt 20 along the direction of conveyance 14. One or more detectors 26 are positioned near the downstream portion 27 of the in-feed conveyor 20 and may be used to detect the presence of an article 12 when located at the downstream portion 27 of the in-feed conveyor. As discussed herein, these detectors 26 maybe used to control the spacing between articles 12 that are being conveyed by the system, among other things.

FIG. 2 shows a bird's eye, cutaway view of the positioner 40 and the entryway 62 of the inspection system. The positioner 40 includes a conveyor belt 42 that receives articles, like luggage, from the conveyor belt 22 of the in-feed conveyor 20. Conveyor belt 42 comprises a pair of belt segments 44, 46 that run parallel to one another along the direction of conveyance 14. Each of belt segments 44 and 46 is mounted to a corresponding set of rollers that is driven by an independent motor. The belt segments 44, 46 can move together in the direction of conveyance 14 to move an article 12 to the inspection system 60. Alternately, the separate belt segments 44, 46 can move relative to one another to rotate an article 12 on the belt 42. This can be accomplished by moving one of the segments faster than the other in the direction of conveyance, or by moving the belt segments in opposite directions.

Positioner 40 includes several features, in addition to separate belt segments, that can be used to orient articles on the conveyor belt to reduce the likelihood of a jam occurrence.

As shown in FIG. 2, the conveyor belt includes rollers 50 incorporated into conveyor belt 42 that can urge articles in directions transverse to the direction of conveyance 14. In the illustrated embodiment, the left hand 44 and right hand 46 belt segments each include rollers 50 that are angled about 45 degrees relative to the direction of conveyance 14 and that are positioned to urge an article toward a central portion 52 of conveyor belt 42 when rotated. The rollers may be driven as the conveyor belt 42 moves in the direction of conveyance 14 such that an article 12, or portions of an article lying on the left hand belt 44 segment are urged toward the right hand side of the conveyor belt 42. Similarly, articles or portions of articles lying on the right hand 46 belt segment may be urged toward the left hand side of conveyor belt 42. Generally, articles are urged by the rollers 50 in each of segments 44, 46 until the forces urging the article in the left and right direction cancel one another out, which often occurs when the article is centered on the conveyor belt.

Figure 3A:
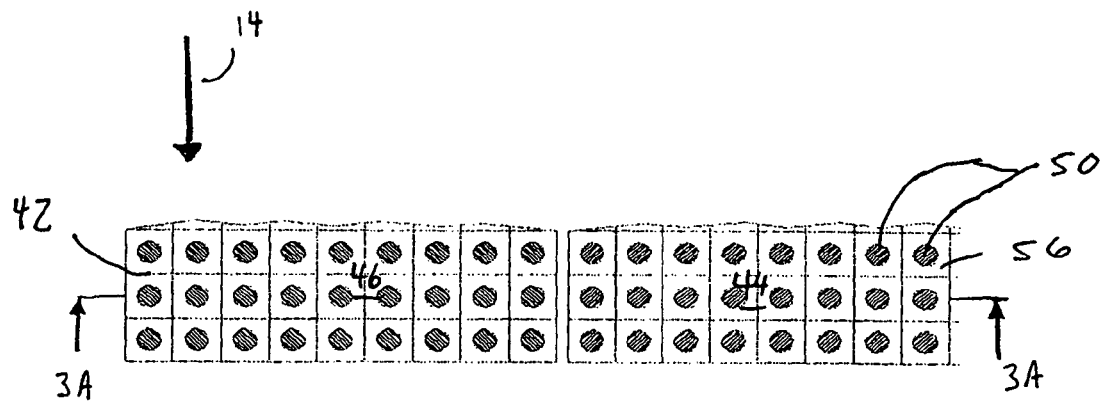
FIG. 3A is top view of rollers incorporated into the conveyor belt of a positioner.
Figure 3B:
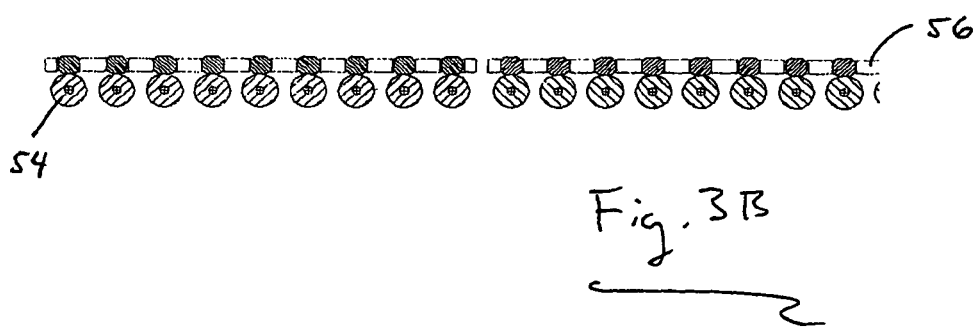
FIG. 3B is a cross-section view of FIG. 3A, taken along lines 3A-3A, showing longitudinal rollers that may drive rollers that are incorporated into the conveyor belt of a positioner.

The rollers that are incorporated into belt segments 44 and 46 may be driven by contact with rollers 54 that lie beneath the substrate 56 of the conveyor belt, as shown in FIGS. 3A and 3B. Frictional engagement between the lower portion of the rollers and the longitudinal rollers 54 causes the rollers 50 to rotate when the conveyor belt 42 is moved. Free rotation of the longitudinal rollers 54 may alleviate side loading and wear on the conveyor belt 42 and the rollers 50 themselves. According to other embodiments, the longitudinal rollers 54 may be driven themselves to, in turn, rotate the rollers 50 that are incorporated into belt 42. In such embodiments, articles may be urged in the direction of conveyance, or rotated about belt 42 without also moving the belt 42. In other embodiments, rollers 50 may be driven through contact with a surface other than that of a longitudinal roller, such as a flat surface that lies beneath belt 42. Still, other mechanisms for driving rollers are possible, as aspects of the invention are not limited in this respect.

Angled fixtures 58 may be located near lateral sides of the conveyor system to position articles in a manner that prevents jams from occurring. FIG. 2 shows one embodiment of angled fixtures 58 located near the downstream portion 59 of positioner 40. The fixtures form roughly an eighteen degree angle with the direction of conveyance 14, and extend from lateral sides walls of the positioner to the narrower width of the inspection system entryway 62. As shown, the angled fixtures 58 extend over a portion of conveyor belt 42 that runs through the positioner 40. Articles that lie on outer portions of belt 42 will contact the angled fixtures 58 when conveyed toward the inspection system entryway 62. Through contact with the fixtures 58, articles are urged toward a central portion 52 of the belt. Such fixtures may prove particularly beneficial for moving or compressing softer articles, like hanging bags and other types of 'soft' luggage. It is to be appreciated that while FIG. 2 shows angled fixtures of a particular configuration and in a particular location, that other constructions and positions of angled fixtures are possible, as aspects of the invention are not limited in this respect.

Figure 4:
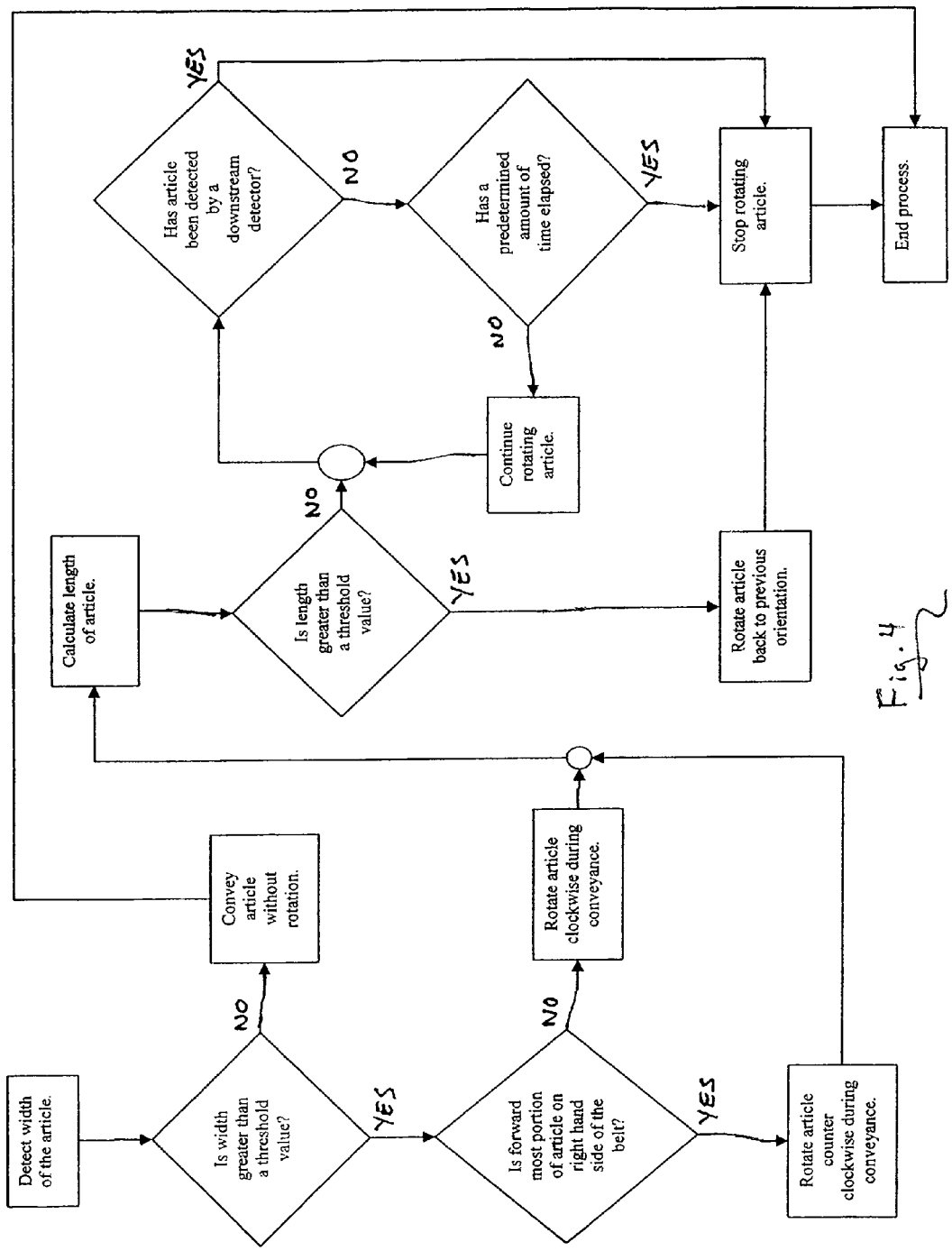
FIG. 4 is a flow chart representing one embodiment of a method for rotating an article to reduce the likelihood of a jam occurrence.

The conveyor system may include a controller 55 programmed to identify when an article should be rotated to reduce the likelihood of a jam occurrence. Once identified, the controller 55 may then automatically control the positioner 40 to rotate the article. FIG. 4 is a flowchart representing an algorithm that may be programmed into the controller to accomplish this, according to some illustrative embodiments.

Detectors 53, positioned near an upstream portion 50 of belt 42 first detect the presence of an article and then measure the distance from each detector 53 to the article. As shown in FIG. 2, the detectors 53 may be offset with respect to one another in the direction of conveyance to prevent one detector from interfering with another. The controller calculates the width of the article 12 at all points along the length of the article passing thereby. To compensate for offset between the detectors, the controller 55 may time-shift signals from the detectors 53 relative to one another. An average speed of the in-feed conveyor 20 may be used in this calculation. An article 12 that is detected to have a width greater than a threshold width is designated to be turned. According to one illustrative embodiment, the threshold width is about 28 inches, although other threshold widths are possible, as aspects of the invention are not limited in this respect.

The controller 55 may also determine which direction to rotate an article, in order to reduce the likelihood of a jam occurrence. For systems that convey luggage, most of which is rectangular in shape, the direction of rotation may be determined by identifying the forward most corner of the article. This determination may be made by assessing the signals received from detectors 53. The controller 55 controls the positioner 40 to rotate the article 12 in a left-hand direction (counter clockwise) to position the article when it is determined that the right hand side of the article is in the forward most position, and the article exceeds the threshold width. Alternately, the article will be turned to the right (clockwise) if the left hand side of the article is in the forward most position. A default direction of rotation may be designated for articles that do not have a forward most portion that lies substantially toward a lateral portion of belt 42. It is to be appreciated that embodiments of the system may use other methods for determining a direction of rotation, and that according to some embodiments, only one direction of rotation may exist, as aspects of the invention are not limited in this respect.

In the illustrated embodiment, the split belt segments are operated in one of three different modes after it is determined whether the article 12 should be rotated. When the article is designated for no rotation, each of the belt segments 44, 46 move in the direction of conveyance 14 at a common speed. According to one embodiment, the substrate 56 of the belt moves at about 7.2 inches per second, although articles being propelled by rollers 50 incorporated into the belt 42 may be moving at speeds faster than the substrate, such as 10.2 inches per second. When an article is designated to turn in the counter clockwise direction, the left hand belt 44 moves at a slower speed in the direction of conveyance, such as about 1 inch per second, while the right hand belt 46 moves at a faster speed, such as about 12 inches per second. For articles designated to rotate in the clockwise direction, the speeds of the left and right hand belts are reversed. Although the above discussed embodiment includes only three modes for conveying articles through the positioner 40, it is to be appreciated that other embodiments may include additional modes, such as modes that convey the article in the direction of conveyance at different speeds, or that rotate the article at varying speeds.

The clockwise and counter clockwise rotation modes may continue until a detector 49, located at a downstream portion 59 in the positioner 40, detects the presence of the article that is being rotated. The article rotation mode then ends, and the belt segments 44, 46 begin to move at a common speed to convey the article out of the positioner 40 and into the inspection system 60. It is to be appreciated that other methods may also be used to end the article rotation mode, as aspects of the invention are not limited in this respect. According to one embodiment, the article rotation mode continues for a predetermined amount of time, such as 3 seconds, 5 seconds, 10 seconds, or any other duration. According to still other embodiments, one or more detectors may make a secondary measurement of the article's width to determine when to stop rotating the article.

The pair of detectors 53 at the upstream portion 50 of the positioner 40 may also be used to measure other characteristics of articles passing thereby, such as the length of an article. It is to be appreciated that most airline luggage that is over 28 inches long, is also under 28 inches wide. In this regard, most luggage that is found to have a width greater than 28 inches will appropriately be designated for rotation so that the longest dimension of the luggage runs parallel to the direction of conveyance 14. On occasion, however, oversize luggage will be encountered that has both a width and a length that is greater than the threshold dimension of 28 inches. To prevent such luggage from being oriented with the longest dimension running transverse to the direction of conveyance, the detectors may calculate the length of the article in a direction parallel to the direction of conveyance. This calculation may be based on the amount of time that it takes the luggage to pass the detectors, and the average speed of the luggage, which may be the same speed as the in-feed conveyor 20 that is pushing the luggage onto the positioner conveyor belt 42. Other techniques for calculating or measuring luggage length are also possible, as aspects of the invention are not limited in this respect.

As represented in FIG. 4, the positioner 40 may stop rotating an article 12 if the article is determined to have a length greater than a threshold length. According to some embodiments, the threshold length is about 32 inches. In the illustrated embodiment, the split belt segments 44, 46 begin rotating the article in the opposite direction, once the controller 55 determines that the article exceeds the threshold length. In this respect, the article is directed back to the orientation in which the article entered the positioner 40.

Figure 5:
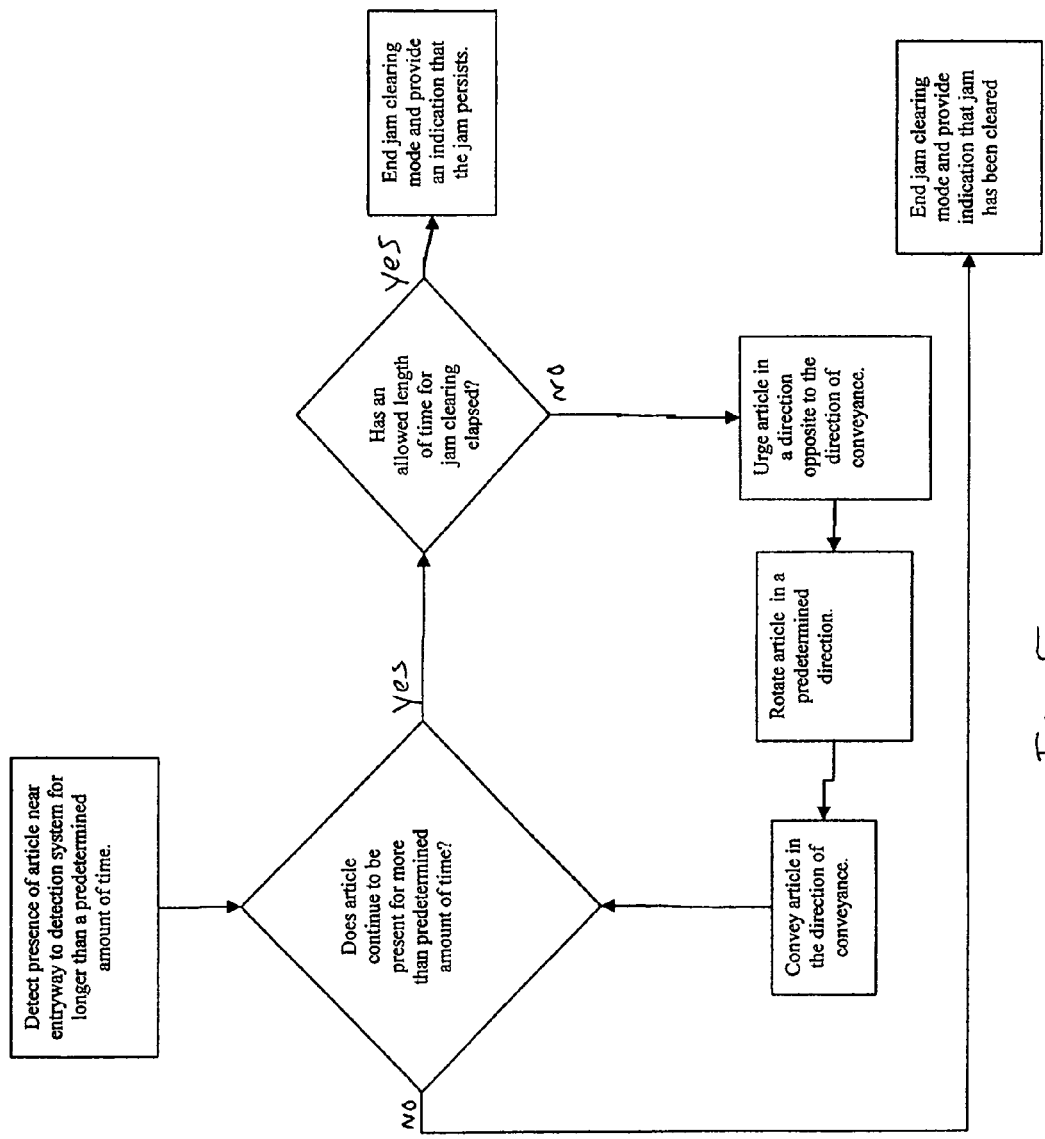
FIG. 5 is a flowchart representing one embodiment of a method for clearing a jam within a conveyor system.

Embodiments of the positioner 40 may be capable of automatically clearing jams that occur. FIG. 5 shows a flowchart representing one method that may be used to clear a jam.

The system may detect a jam through various mechanisms. According to the illustrated embodiment, a jam is identified when one or more detectors located at a downstream portion 59 of the positioner 40 detect that an article has been present for longer than a threshold duration of time. The threshold duration may be associated with the length of time that it takes for an article of the maximum length to pass detectors 53. In one embodiment, the threshold duration is 8 seconds, although other durations are possible. According to some embodiments, threshold duration may correspond to the length of each article, as calculated by the upstream detectors 53 of the positioner 40, as aspects of the invention are not limited to any one particular way of detecting a jam.

When a jam is identified, the controller 55 may prevent the in-feed conveyor 20 from delivering any additional articles 12 to the positioner 40. This may be accomplished by stopping the in-feed conveyor 20 immediately when a jam is detected, according to some embodiments. Alternately, the in-feed conveyor 20 may continue to operate until the detectors 26 at the downstream portion of the in-feed conveyor 20 detect the presence of an article 12, at which time the in-feed conveyor 20 may be stopped to prevent additional articles 12 from being conveyed to the positioner 40. Still, other methods may be used to prevent additional articles from being delivered to the positioner when a jam is detected, as aspects of the invention are not limited in this respect.

A controller of the system may initiate an automatic jam clearing routine after a jam has been detected. The flowchart diagram of FIG. 5 represents one embodiment of a method that may be used to clear a jammed article. After detecting the jam, conveyor 42 may reverse direction to urge the luggage away from the downstream portion 59 of the positioner 40. The split belt segments 44, 46 are also moved relative to one another to rotate the article in a first direction. The article is then again moved in the direction of conveyance 14 to move the luggage back toward the entryway 62 of the inspection system.

The controller may include features to actively determine when a jam has been cleared. As represented in FIG. 5, detectors 49 near the downstream portion 59 of belt 42 can provide an indication when the luggage is no longer present, indicating that a jam has been cleared. Such an indication may be used by the controller to terminate the jam clearing mode. Alternately, the jam clearing mode may be ended by the passage of a predetermined amount of time, such as 30 seconds, 1 minute, 2 minutes, or any other amount of time, or by the manual intervention of an operator. Still, other ways to determine when a jam has been cleared are possible, as aspects of the invention are not limited in this respect. Once the jam is cleared, the in-feed conveyor 20 may resume normal operation, conveying additional articles toward the positioner 40.

Articles may be rotated additional times, if a jam persists after an article has been rotated once and urged in the direction of conveyance 14. As represented in FIG. 5, additional rotations may continue until the jam has been cleared, or the jam clearing mode is otherwise ended. According to one embodiment, a jammed article is first rotated according to a predetermined schedule by first rotating counter clockwise, then clockwise, then clockwise again, counter clockwise, and then clockwise. However, it is to be appreciated that other predetermined schedules, or actively determined routines are also possible, as aspects of the invention are not limited in this respect.

The positioner may include an indicator 47 that alerts an operator when the jam clearing mode has begun, when a jam has been cleared, or when the jam clearing mode could not clear a jammed article. According to some embodiments, a light inside of the positioner is illuminated to indicate the existence of a jam, and to allow a supervising operator to view the situation inside of the positioner, such as to determine whether manual assistance would be beneficial. Here, the operator could intervene by manually controlling the conveyor belt 42 to reverse direction and/or turn the article to an appropriate orientation for passage into the inspection system 60. Alternately, the operator may intervene by turning the system off, which may unlock any doors that provide access to the internal environment of the positioner. The operator may then manually reposition the article for delivery to the inspection system or remove the article altogether, and then resume automatic operation of the system.

Embodiments of the conveyor system may also control the spacing between articles that are being conveyed. According to one embodiment, the article spacing is controlled at the transition from the in-feed conveyor 20 to the positioner 40 and/or at the transition from the positioner 40 to the inspection system 60. Detectors present near downstream portion 27 of the in-feed conveyor 20 or a downstream portion 59 of positioner 40 identify a time that has elapsed since the previous article passed the detector. This time, and an average speed of a downstream conveyor, may be used to calculate the distance traveled by the prior article to pass the detector. The upstream conveyor may slow down or stop when the system determines that the distance traveled by the prior article is less than a minimum article spacing. The upstream conveyor may resume once the distance traveled by the prior article to pass the detector is equal to or greater than the minimum article spacing.

Various occurrences may alter the spacing of articles that are being conveyed. By way of example, 'soft' luggage conveyed by belt 42 may move at substantially the same speed as the substrate of belt 42 (see FIG. 3), while 'hard' luggage may be moved faster by being conveyed by rollers 50 incorporated into belt 42. Other occurrences, such as some modes for rotating articles, or some modes for clearing jams, may also cause the spacing between articles to changes as they are conveyed through the positioner.

According to one illustrative embodiment, the conveyor belt 64 of the inspection system 60, or any other conveyor belt that is directly downstream from the positioner 40, may be operated with an average speed that is greater than the average speed of belt 42 in the positioner 40. In one embodiment, the belt 64 of the inspection system operates with a speed that is 20% faster than that of the positioner 40. Operating the belt of the inspection system in this manner can provide a minimum spacing that will exists between articles when they are present in the inspection system.

The conveyor system may operate in different modes, depending on the system throughput, to reduce the likelihood of a jam from occurring. According to one embodiment, the flow of articles into the positioner is measured by detectors located upstream of the positioner, such as at a location near where articles are placed into a luggage handling system. However, aspects of the invention are not limited in this respect, as modes may be altered manually, or through other means.

For lower throughputs, such as 300 or fewer articles per hour, according to one embodiment, the conveyance system may be automatically operated in a mode that only allows a single article to enter the positioner at a time. Here, an article in the positioner passes detectors near a downstream portion of the positioner before a subsequent article is released to the positioner by the in-feed conveyor. Allowing only a single article into the positioner can reduce the likelihood of jam from occurring, and increase the likelihood of clearing a jam, should one occur.

For greater article throughput, such as up to 450 articles per hour according to one embodiment, up to two articles are allowed into the positioner at a common time, unless an article in the positioner has been designated to be turned. Here, no additional articles are allowed into the positioner until the article designated to be turned, has in fact been turned.

For even greater article throughput, such as greater than 450 articles per hour, and up to 600 articles per hour, according to one embodiment, no limits are placed on the number of articles that may be fed to the positioner at a common time.

Embodiments of the conveyance system may also include a mode for performing maintenance and/or troubleshooting the system.

The conveyor system may be controlled through various different devices. According to the embodiment illustrated in FIG. 1, a controller 55 is mounted on the positioner 40 such that the controller may be readily accessed by an operator who is manually clearing a jam. Controls may also be located remote from the positioner, as aspects of the invention are not limited in this respect. Typical controls include an emergency stop, an inspection system on/off control, an positioner start/reset, and manual forward/auto/manual reverse controls.

Indicators may be incorporated into the system to alert an operator of various occurrences, such as the mode in which the system is operating, whether a jam has occurred or has been cleared, whether an oversize article has been detected, and the like, as aspects of the invention are not limited in this respect.

The controller may comprise a programmable logic controller, a microcomputer, or other programmable or non-programmable devices. The controller may control various components of the conveyor system, including the in-feed conveyor, the positioner, the inspection system, and/or other components, as aspects of the invention are not limited in this respect. By way of example, according to some embodiments, the controller monitors door interlocks and overall inspection system status.

According to one example, a conveyor system implemented in a US airport luggage handling system included an inspection system that received luggage directly from an in-feed conveyor, without first passing the luggage through a positioner. Approximately 10.0% of the luggage fed to the inspection system became jammed and required manual assistance before the jam could be cleared. The same system, with the addition of a positioner that operates according to the article rotating method represented by FIG. 4 was able to reduce the occurrence of jams that required manual intervention to 1.0% of the luggage fed to the inspection system. When the jam clearing method, as represented by FIG. 5, was incorporated into the operation of the positioner, the occurrence of jams that required manual intervention to be cleared was reduced to 0.1% of the luggage conveyed to the inspection system.

Having thus described several aspects of at least one embodiment of this invention, it is to be appreciated that various alterations, modifications, and improvements will readily occur to those skilled in the art.

The above-described embodiments of the present invention can be implemented in any of numerous ways. Also, the various embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, aspects of the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A conveyor apparatus comprising:
   a conveyor belt having:
      a first belt segment that, when operated, moves along a first axis to convey an article;
      a second belt segment that, when operated, moves along the first axis side-by-side with and substantially parallel to the first belt segment;
   a first detector that detects a width of the article in a direction that lies transverse to the first axis;
   a second detector that provides an indication that the article is jammed on the conveyor belt; and
   a controller that controls the first belt segment and the second belt segment to operate in at least two modes, wherein:
      the controller controls the first belt segment to move relative to the second belt segment to rotate the article on the conveyor belt and then controls the first belt segment to move in conjunction with the second belt segment in a forward direction in a first of the at least two modes when the width is greater than a threshold value, and
      the controller controls the first belt segment to move in conjunction with the second belt segment to move the article in a backward direction and then controls the first belt segment to move with respect to the second belt segment to rotate the article on the conveyor belt in a second of the at least two modes when the article is indicated to be jammed on the conveyor belt.

2. The conveyor apparatus of claim 1, wherein the controller identifies a direction in which to rotate the article.

3. The conveyor apparatus of claim 2, wherein the controller rotates the article in a clockwise direction when a leading portion of the article is identified as lying closer to a left hand side of the conveyor belt than a right hand side of the conveyor belt.

4. The conveyor apparatus of claim 1, wherein the first belt segment is moved faster than the second belt segment in a common direction to rotate the article.

5. The conveyor apparatus of claim 1, further comprising: a third detector positioned downstream from the first detector, wherein the controller stops rotating the article when the third detector detects the presence of the article.

6. The conveyor apparatus of claim 1, wherein the controller stops rotating the article after the passage of a predetermined amount of time.

7. The conveyor apparatus of claim 1, further comprising: an article on the conveyor belt.

8. The conveyor apparatus of claim 1, wherein the threshold value is about 28 inches.

9. The conveyor apparatus of claim 1, wherein the controller calculates a length of the article based on an amount of time that elapses as the article passes the first detector and an average speed at which the article moves.

10. The conveyor apparatus of claim 9, wherein the controller stops rotating the article when the length is greater than a threshold length value.

11. The conveyor apparatus of claim 10, wherein the threshold length value is about 32 inches.

12. The conveyor apparatus of claim 1, further comprising: angled fixtures that, when contacted by an article, urge the article laterally on the belt.

13. The conveyor apparatus of claim 1, wherein the first belt segment comprises rotatable members incorporated into the first belt segment that urge the article on the first belt segment in a direction that lies transverse to the first axis.

14. The conveyor apparatus of claim 13, wherein the second belt segment comprises rotatable members incorporated into the belt that urge the article on the belt in a direction that lies transverse to the first axis.

15. The conveyor apparatus of claim 14, wherein the rotatable members incorporated into the first belt segment and the rotatable members incorporated into the second belt segment cooperate to urge the article toward a central portion of the conveyor belt.

16. A method of positioning an article on a conveyor, the method comprising:
   measuring a width of an article in a direction transverse to a direction in which the article is being conveyed;
   determining automatically whether the width of the article is greater than a threshold width;
   determining automatically whether the article is jammed on the conveyor; and
   rotating the article by moving a first belt segment and a second belt segment of the conveyor relative to one another and then moving the first belt segment and the second belt segment together in a forward direction when the width of the article is greater than the threshold width; and
   moving the first belt segment and the second belt segment together in a backward direction and then rotating the article by moving the first belt segment and the second belt segment relative to one another when the article is detected to be jammed,
wherein the first belt segment and the second belt segment are arranged side-by-side to one another.

17. The method of claim 16, wherein rotating the article comprises:
   detecting a forward most portion of the article;
   determining on which lateral side of the conveyor belt the forward most portion lies; and
   rotating the article in a direction of the forward most portion.

18. The method of claim 16, wherein rotating the article continues until the article is present at a downstream portion of the conveyor.

19. The method of claim 16, wherein rotating the article continues until a predetermined amount of time has elapsed.

20. The method of claim 19, wherein the threshold width is about 28 inches.

21. The method of claim 16, further comprising:
   calculating a length of the article; and
   stopping rotation of the article when the length of the article is greater than a threshold length value.

22. The method of claim 21, wherein the threshold length value is about 32 inches.

23. The method of claim 21, further comprising:
   rotating the article in an opposite direction to return the article toward a previous orientation.

24. The method of claim 16, further comprising:
   urging the article in a direction transverse to the direction in which the article is being conveyed.

25. The method of claim 24, wherein urging the article comprises urging the article with rotatable members that are incorporated into a conveyor belt.

* * * * *